United States Patent [19]

Yukawa

[11] 4,189,114
[45] Feb. 19, 1980

[54] FAST REWINDING DEVICE FOR CASSETTE TAPES

[76] Inventor: Yoshiki Yukawa, No. 19-5, 2-chome Ohoka, Minami-ku, Yokohama, Kanagawa, Japan

[21] Appl. No.: 919,690

[22] Filed: Jun. 27, 1978

[30] Foreign Application Priority Data

Jun. 28, 1977 [JP] Japan .............................. 52-84970[U]

[51] Int. Cl.² .............................................. B65H 59/38
[52] U.S. Cl. ..................................... 242/186; 242/198; 360/96.1; 360/74.6
[58] Field of Search .................................. 242/197–200, 242/186, 75.52; 360/96, 132, 73; 318/6, 7

[56] References Cited

U.S. PATENT DOCUMENTS

| | | | |
|---|---|---|---|
| 2,926,860 | 3/1960 | Pomarico | 242/186 |
| 3,244,954 | 4/1966 | Branco | 318/7 |
| 3,495,787 | 2/1970 | Wallace | 242/199 |

*Primary Examiner*—Leonard D. Christian
*Attorney, Agent, or Firm*—Lerner, David, Littenberg & Samuel

[57] ABSTRACT

A fast rewinding device for cassette tapes in a tape recorder which comprises a main body on which a cassette tape having transparent window means is adapted to be placed and which is provided with a light source and a light receiving element spaced away from and in alignment with said light source so that the light from said light source is received by said light receiving element through the transparent window means. An electrical circuit is provided including a motor for rotating the tape in the rewinding direction, a power source for actuating said motor, a transistor electrically connected between said motor and said power source, a phototransistor adapted to limit electric current to said transistor upon receipt of the light from said light source through said window means, a biasing resistor, a variable resistor for calibrating the circuit and a power source switch for energizing said electrical circuit.

6 Claims, 3 Drawing Figures

FAST REWINDING DEVICE FOR CASSETTE TAPES

BACKGROUND OF THE INVENTION

This invention relates to a fast rewinding device for cassette tapes in a tape recorder.

There have been proposed and practically employed a variety of tape recorders employing cassette tapes. In prior art cassette tape recorders, when the tape in the cassette is rewound after one playing on the tape, the movement of the tape is terminated through the utilization of the tension applied on the tape by stops at either end of the tape when the tape rewinding has reached the terminal stage. This is done without reducing the rate of movement of the tape before the stop is reached.

When the tape in the cassette is rewound at high speed, the tape experiences a high pulling force at the end of the tape at the terminal stage of the rewinding, and the tape frequently tends to break. For this reason, the rewinding of cassette tapes at high speeds has not been practically possible in prior art tape recorders.

SUMMARY OF THE INVENTION

Therefore, an object of the present invention is to radically reduce the movement rate of the tape when the rewinding has reached a point immediately before the terminal stage, thereby effectively eliminating breakage of the tape.

According to the present invention, there is provided a fast rewinding device for cassette tapes in a tape recorder in which an electrical circuit connected between a motor for rotating the tape in the rewinding direction and a power source includes a transistor and an electrical circuit element such as a phototransistor adapted to limit the electrical current flowing through said transistor when said phototransistor receives light from a light source through transparent window means provided in the center of the cassette.

The above and other objects and attendant advantages of the present invention will be more readily apparent to those skilled in the art from a reading of the following detailed description in conjunction with the accompanying drawings which show one embodiment of the invention. The scope of the invention is of course not limited to the described embodiment, but rather is defined by the appended claims.

PREFERRED EMBODIMENT OF THE INVENTION

Figure 1:
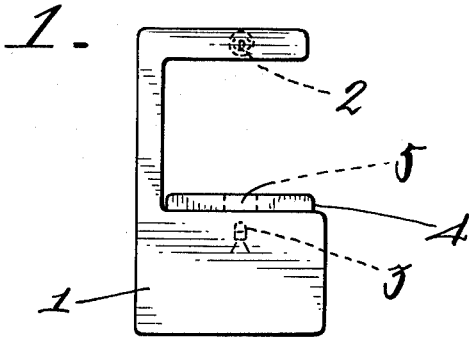
FIG. 1 is a side elevational view of the preferred embodiment of a fast rewinding device constructed in accordance with the principles of the present invention.
Figure 2:
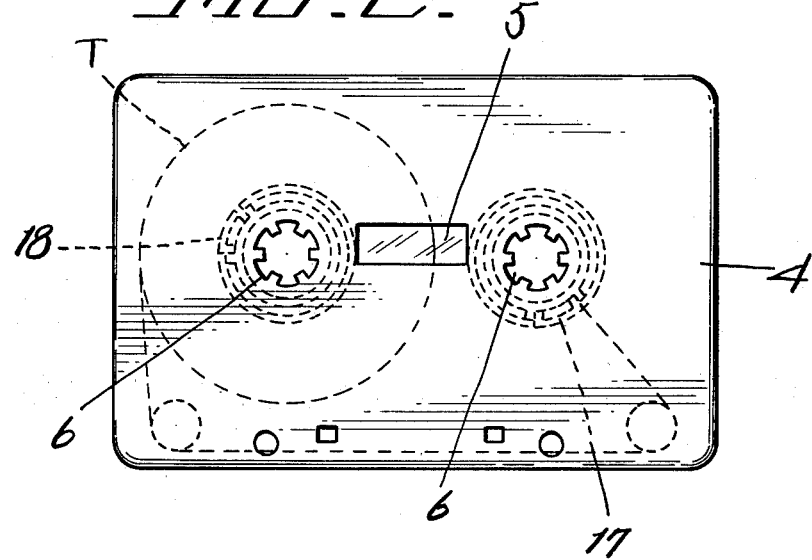
FIG. 2 is a top plan view of a cassette tape for use in the rewinding device of FIG. 1.

The present invention will be now described referring to the accompanying drawing which shows the preferred embodiment of the fast rewinding device for cassette tape recorders. The fast rewinding device comprises a main body 1 of substantially U-shaped cross-section as seen in FIG. 1. A light source 2 is mounted on the upper arm of the main body and a light receiving element 3 is provided within the lower arm of the main body directly below the light source 2 for receiving light from said source. A cassette tape 4 is adapted to be placed between said source 2 and said receiving element 3. The cassette tape 4 shown in FIG. 2 is of conventional design and is provided with aligned transparent windows 5 in the upper and lower walls through which the light from the light source 2 is received by the light receiving element 3. A pair of through holes 6 are positioned on opposite sides of the aligned transparent windows 5 and extend through the upper and lower walls of the cassette tape 4 for engaging the cassette driving spindles (not shown) which extend vertically from the top of the lower arm of the main body 1.

The position of the light source 2 and light receiving element 3 is so selected that light from the light source is allowed to radiate through the transparent windows 5 in the cassette 4 to the light receiving element 3 by the tape T just before the rewinding of the tape terminates.

Figure 3:
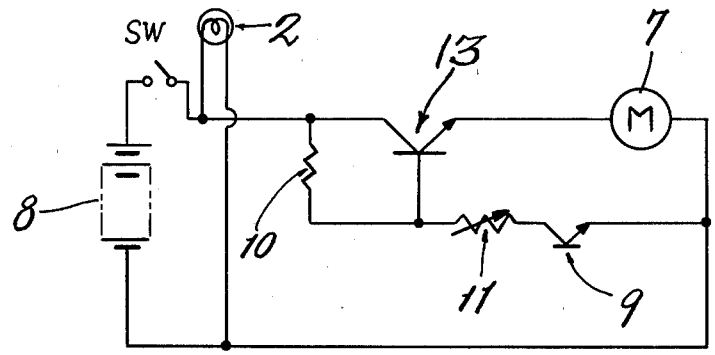
FIG. 3 is a schematic diagram of the electrical circuit for the rewinding device of FIG. 1.

The electrical circuit of the fast rewinding device of the invention will be now described referring to FIG. 3 of the accompanying drawing. The electrical circuit includes a motor 7 adapted to rotate the spindles in the tape rewinding direction, a power source 8 for energizing the motor 7, a transistor 13 connected in series with said motor 7 and said power source 8, a phototransistor element 9 adapted to limit the amount of electric current to the transistor 13 when the element 9 receives light from the light source 2 through the transparent windows 5, a biasing resistor 10, a variable resistor 11 for calibrating the circuit and a power source switch SW which is adapted to energize the electrical circuit when the power source switch SW is closed.

With the above-mentioned construction of the component parts of the fast rewinding device according to the invention, when the motor 7 is rotated at a high rate due to electric current which flows through the motor 7 and the transistor 13, the motor rotates the rewind spindles (not shown) at the same rate to rewind the tape T. When the tape T which normally interrupts the passage of light from the light source 2 to the light receiving element 3 through the transparent windows 5 unwinds to a point where the passage of light is no longer interrupted, the light enters the phototransistor and allows electric current to flow therethrough. The amount of electric current flowing through series transistor 13 and motor 7 is thus decreased, causing the motor to suddenly slow down just before the end of the tape is reached to a rate whereby the likelihood of tape breakage at the end of the tape is greatly reduced.

While the preferred embodiment of the invention has been shown and described in detail, it should be understood that the embodiment is for illustration purposes only and is not to be taken as a definition of the invention which is limited only by the scope of the appended claims.

I claim:

1. A fast rewind apparatus in a tape recorder for rewinding tape from a first reel onto a second reel of a tape cassette, the tape cassette having a window extending therethrough adjacent at least said first reel, said first rewind apparatus comprising:
   a motor for causing the cassette reel to be rotated in the rewind direction to rewind the tape from said first reel onto said second reel;
   a light source for radiating light;
   a photosensitive means for receiving radiated light;
   mounting means for mounting said light source and said photosensitive means on opposite sides of said tape cassette in alignment with said window so that said photosensitive means receives light from said light source directed through said window transversely of the direction that the tape moves during rewinding when the amount of tape on said first reel is less than a predetermined amount, and so that the tape on said first reel blocks transmission of radiated light from said light source to said photosensitive means when the amount of tape on said first reel is greater than said predetermined amount; and response means responsive to said photosensitive means receiving light for decreasing the speed of said motor.

2. A fast rewind apparatus according to claim 1 further including a power source for energizing said motor; and wherein said response means comprises transistor means connected in series with said motor and said power source, and bias means for biasing said transistor means in response to said photosensitive means receiving light to reduce the current flowing through said transistor means and said motor.

3. A fast rewind apparatus according to claim 1 in which said tape recorder includes a recorder body on which said tape cassette is adapted to be disposed; and wherein said mounting means includes a first arm affixed to said recorder body for supporting said light source to radiate light through said window in said tape cassette supported on said recorder body and a second arm portion affixed to said recorder body on the opposite side of said tape cassette for supporting said photosensitive means in alignment with said light source and said window.

4. A fast rewind apparatus according to claim 2 wherein said photosensitive means comprises a phototransistor.

5. A fast rewind apparatus according to claim 1 further including an on-off switch connected in series with said transistor means, said motor and said power source.

6. A fast rewind apparatus according to claim 2, 4, or 5 wherein said biasing means includes a fixed value resistor connected across the collector-base junction of said transistor means and a variable calibration resistor connected in series with said photosensitive means between the base of said transistor means and said power source.

* * * * *